United States Patent

Jeong et al.

[11] Patent Number: 5,727,102
[45] Date of Patent: Mar. 10, 1998

[54] MULTIFIBER OPTICAL CONNECTOR FOR OPTICAL RIBBON CABLE

[75] Inventors: Myung-Yung Jeong; Oh-Gone Chun; Seung-Ho Ahn; Tae-Goo Choy, all of Daejeon, Rep. of Korea

[73] Assignee: Electronics and Telecommunications Research Institute, Daejeon, Rep. of Korea

[21] Appl. No.: 572,646

[22] Filed: Dec. 14, 1995

[30] Foreign Application Priority Data

Nov. 9, 1995 [KR] Rep. of Korea ............... 95-40554

[51] Int. Cl.$^6$ ............................................. G02B 6/38
[52] U.S. Cl. ........................... 385/59; 385/71; 385/114
[58] Field of Search ............................. 385/53, 59, 60, 385/63, 65, 71, 78, 83, 114

[56] References Cited

U.S. PATENT DOCUMENTS

| | | | |
|---|---|---|---|
| 4,142,776 | 3/1979 | Cherin et al. | 385/71 |
| 5,093,881 | 3/1992 | Bortolin et al. | 385/114 |
| 5,208,889 | 5/1993 | Cedrone et al. | 385/114 |
| 5,257,334 | 10/1993 | Takahashi | 385/65 |

OTHER PUBLICATIONS

Iwano, et al.: "Compact and Self-Retentive Multi-Ferrule Optical Backpanel Connector"; pp. 1356–1362, Journal of Lightwave Technology, vol. 10, No. 10, Oct. 1992.

Nagasawa, et al.: "Single-Mode Multifiber Connectors for Future Large Scale Subsciber Networks"; pp. 29–32, MoP1.5 [No Journal Name; No Date].

Satake, et al.: "MT Multifiber Connectors and New Applications"; pp. 994–999, IEEE Proceedings 1994 [no month].

*Primary Examiner*—John D. Lee
*Attorney, Agent, or Firm*—Jacobson, Price, Holman & Stern, PLLC

[57] ABSTRACT

A multifiber optical connector for optical ribbon cable which must be essentially used in the optical line that requires a repeated connection and separation to transfer or to interrupt simultaneously optical signals with low loss by attaching to an end of the optical ribbon cable arranged in a line. In order to overcome a difficulty of production technique and to constitute a suitable net, the optical cable consists of a short circuit which must be connected for the maintenance of the optical path, in which the optical cable must be very precisely connected so as to minimize a loss. The multifiber optical connector for optical ribbon cable according to the present invention is comprised of arranging means comprising a ferrule to fix and arrange ends of both sides of multifiber optical cable for an exact connection, an arranging block for connecting section of both sides of the said ferrule to be coincided exactly and a leaf spring to act an elastic force upon the said ferrule; and connecting means comprising an adaptor, an optical cable protecting instrument and a plug in which the said arranging means are established and it connects them strongly, and which is capable of contributing to settle a period of an optical communication by early realization of a network of optical passivity in which a heart part of the optical connector, such as ferrule, arranging elements and connecting structure are embodied by using new materials and new structure and thus, commercial-viability, performance and assembling property are improved.

5 Claims, 2 Drawing Sheets

(a)

(b)

MULTIFIBER OPTICAL CONNECTOR FOR OPTICAL RIBBON CABLE

FIELD OF THE INVENTION

The present invention relates to parts for an optical communication. More specifically, the present invention relates to a multifiber optical connector for optical ribbon cable which is essentially used in an optical line that requires a repeated connection and separation to transfer or to interrupt simultaneously optical signals with low loss by attaching to an end of optical ribbon cable arranged in a line.

BACKGROUND OF THE INVENTION

As development of a scientific technique requires transmission of more and more information, light has been used as a means of communication for accepting a variety of information so as to transfer a lot of information at once.

A transmission of information by light must be able to handle a large capacity and ultrahigh speed in order to apply multimedia techniques, such as phonetic data and moving image. Thus, as a transmission medium, optical cables are changing to mainly use multifiber, instead of a singlefiber that is now in use.

In order to overcome a difficulty of production technique and to constitute a suitable net, the optical cable consists of a short circuit which must be connected for the maintenance of the optical path. The optical cable must be very precisely connected so as to minimize a loss of signal.

One such connection method now being used is a permanent connection by a connector. An optical connector also allows for the case that requires a repeated connection and separation at the time of constituting a network of optical subscribers. Thus, the optical connector should be capable of attaching and falling repeatedly. Among them, in order to connect a multifiber optical cable, it has been preferably used recently a method to connect rapidly the optical path by using the cable to which the connector is previously attached.

The multifiber optical connectors invented to date include a method to overlap a singlefiber, a method to form a V-type groove in a Silicone substrate and to connect, and a method to connect collectively by an arrangement of optical fiber.

The first method is widely used, but causes too many disadvantages at the installation to compact the system. The second method has a difficulty in the production technique. Thus, the last method is the most advantageous.

The above last method has not been used widely, but is advantageous in view of a safety of connection for commercial viability, and a miniaturization.

In the multifiber optical connector embodied by this method, it is most important to produce a ferrule for the arrangement. As a material of ferrule, it is used glass particle-reinforced epoxy resins in order to reduce a thermal expansion coefficient to a level of $2 \times 10E-5$ for a thermal stability. The shaping is a low pressure transfer shaping method.

Also, the multifiber optical connector is made of two guide pins for the arrangement and is made of a clamp spring for the maintenance of bonding strength.

In the above connector, it is essential to secure superprecision production technique so as to reduce any loss of signal.

The typical multifiber optical connectors include an overlapping type of singlefiber and a type to use a superprecision cylindrical metal rod in the arrangement.

In the case of an overlapping type of singlefiber, the disadvantages are a raise in cost of the connector due to an unsuitableness at the installation to compact and miniaturization of systems hereinafter, necessity of precision of higher order in the production technique at the time of miniaturizing and also necessity of development of the production technique.

Another type of connector is one which etches a Silicone substrate, fixes the optical fiber and then, uses a superprecision metal rod for the arrangement thereof and a type to use precision shaping and a metal rod. Both of two cases accompany a superprecision processing technique of lower level than micron and shaping technique and thus, it is hardly impossible to develop products.

SUMMARY OF THE INVENTION

The object of the present invention devised in order to solve these problems is to provide a multifiber optical connector for optical ribbon cable which is capable of contributing to settle a period of an optical communication by early realization of a network of optical passivity, in which a heart part of the optical connector, i.e., ferrule, arranging elements and connecting structure are embodied by using new materials and new structure and thus, commercial-viability, performance and assembling property are improved.

For this purpose, the present invention is characterized in that it is comprised of arranging means having both sides of multifiber optical capable for an exact connection, an arranging block for connecting section of both sides of the said ferrule to be coincided exactly and a leaf spring to act an elastic force upon the said ferrule; and connecting means comprising an adaptor, an optical cable protecting instrument and a plug in which the said arranging means are established and it connects strongly to them.

The said arranging means is characterized in that it comprises a V-type of an arranging block which is fitted in the bottom of an adaptor and has a groove at the upper side thereof; a ferrule having a dove tail groove is formed in the lower part thereof so as to be capable of inserting into the arranging block and, an introduction part having a lot of fine holes into which the optical fiber is inserted, is present; and a leaf spring established in spring inserting grooves at both sides of the plug so as to act an elastic force upon the back side of the said ferrule.

The said connecting means is characterized in that it comprises a plug which is comprised of the upper component and the lower component to improve assembly property and in which a cantilever having elasticity and plug projection are formed: an optical cable protecting instrument to which the said plug is inserted and connected; and an adaptor so as to be capable of fastening plugs of both sides.

BRIEF DESCRIPTION OF THE DRAWINGS

Further features and advantages will become apparent from the following and a more particular description of the preferred embodiment of the invention, as illustrated in the accompanying drawings, and in which.

DETAILED DESCRIPTION OF THE INVENTION

The present invention will be described in detail with reference to the accompanying drawings hereinafter.

Figure 1:
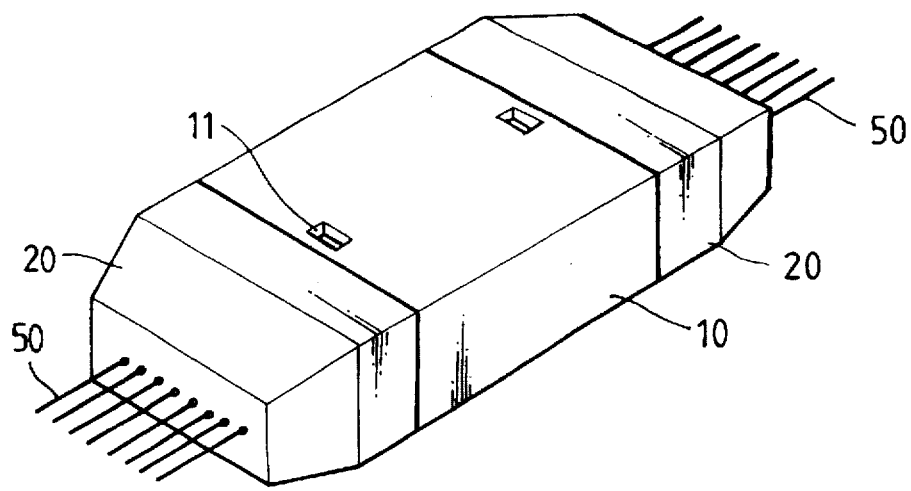
FIG. 1 is a perspective view of the assembly of the multifiber optical connector showing the connection state of the multifiber optical cable of the present invention

FIG. 1 is a perspective view showing the assembly of the optical connector of the present invention, in which the optical cable protecting instrument 20, having the optical ribbon cable 50 fitted in both sides thereof, is inserted and connected by the center adaptor 10.

Figure 2:
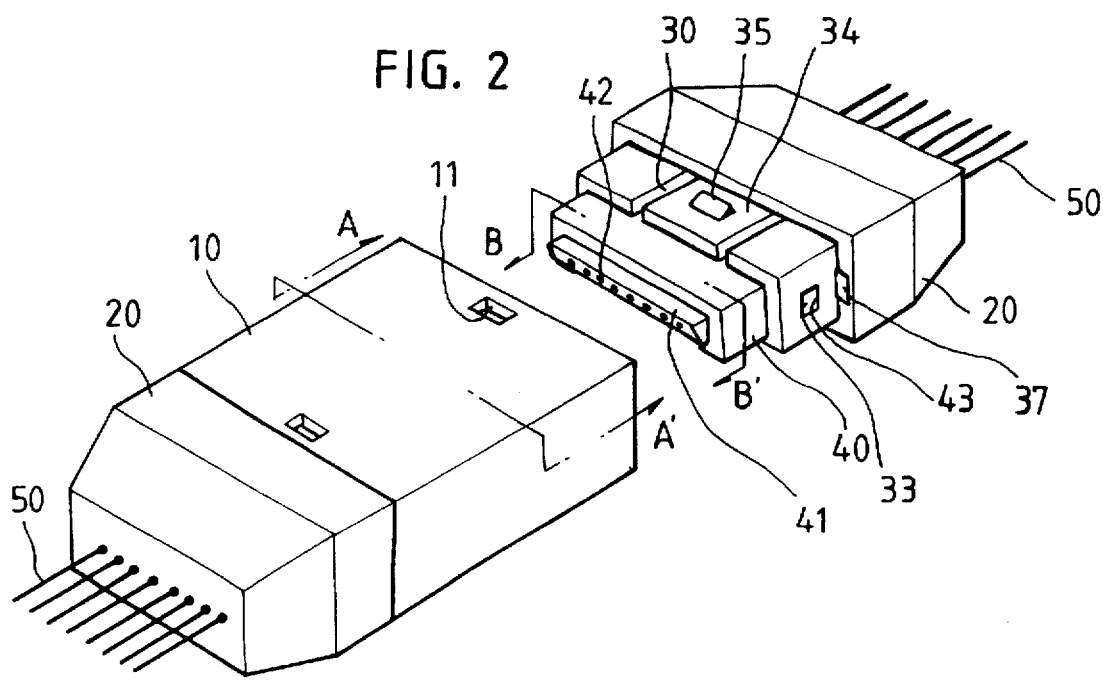
FIG. 2 is a perspective view showing the separation state of one side of an optical cable protecting instrument in the optical connector of the present invention.

FIG. 2 is a perspective view showing the separation state of one side of the optical cable protecting instrument 20 in the optical connector of the present invention.

In the inner side of the said optical cable protecting instrument 20, a plug 30 is settled and also, in the inner side thereof, a ferrule 40, which protects and arranges the optical cable 50, is inserted.

In edges of both sides of the said adaptor 10, a fastening groove 11 is provided. A plug projection 35 is formed in the upper side of the plug 30 and fastened at the time of connection. The groove 11 and plug projection 35 form a strong connection between adaptor 10 and plug 30.

Figure 3:
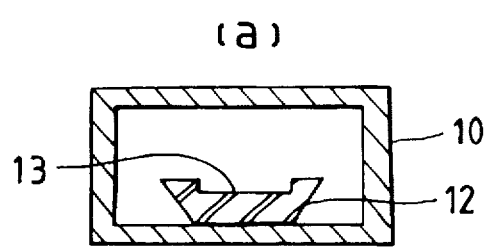
FIG. 3 is a cross-sectional view showing the specific embodiment of the present invention, in which (a) is A–A' section of an adaptor, and (b) is B–B' section of a ferrule.
Figure 3:
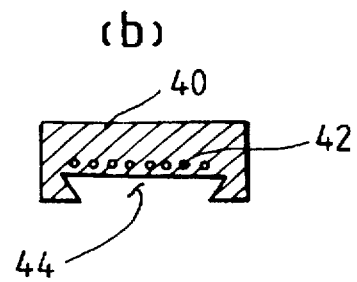

FIG. 3A is a cross-sectional view showing the inner constituting state of the adaptor 10, in which a V-type of an arranging block 12 has a groove 13 formed in the upper side. The block 12 is established in the bottom of the adaptor 10.

FIG. 3B is a cross-sectional view of a ferrule 40, in which at the front part, an introduction part 41 having a lot of fine holes 42 formed to which the optical cable 50 is inserted, is projected. And at the lower part thereof, a dove tail groove 44 is formed so as to be capable of arranging exactly at the time of connecting the optical path by inserting into the arranging block 12 established in the inner bottom of the adaptor 10 depicted in the above FIG. 3A.

The optical cable 50 is arranged, assembled and protected at an inside of the said ferrule 40.

Figure 4:
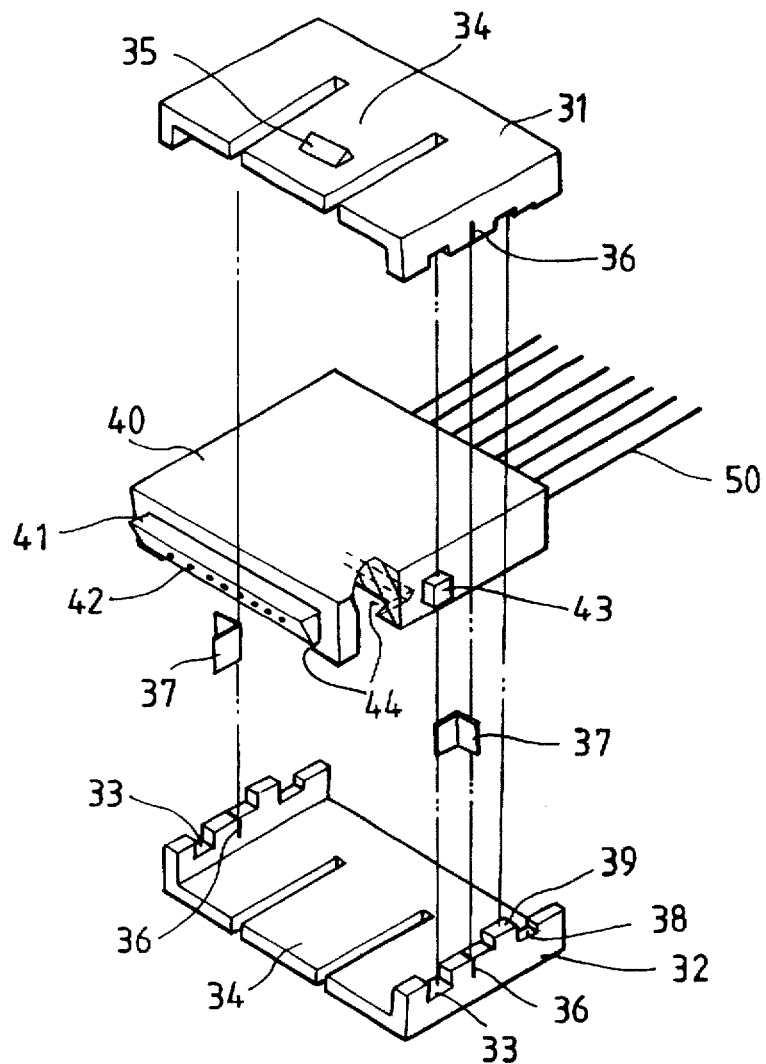
FIG. 4 is a perspective view showing the separation state of a ferrule and a plug of the present invention.

FIG. 4 is a separation perspective view showing the connecting state of ferrule 40 and a plug 30.

As shown in the drawings, a side lug 43 is formed in both sides of the said ferrule 40 so as to insert into a ferrule attaching part 33 of the plug 30 and connect thereto.

As shown in the drawings, the plug 30 to which the said ferrule 40 is inserted and connected, consists of an upper component 31 and a lower component 32 which are connected with each other by a lot of projections 39.

In each of the said upper component 31 and the lower component 32, a cantilever 34 sectioned in both sides is formed so as to connect easily by applying elasticity to a plug projection 35 connected to a fastening groove 11 of an adaptor 10.

A leaf spring 37 having an elastic action is inserted into a spring inserting groove 36 in both sides of the said plug 30.

The said leaf spring 37 is used to establish the exact position of ferrule 40 and to give elasticity so that it can be connected easily.

The said plug 30 is inserted and connected into the optical cable protecting instrument 20.

Figure 5:
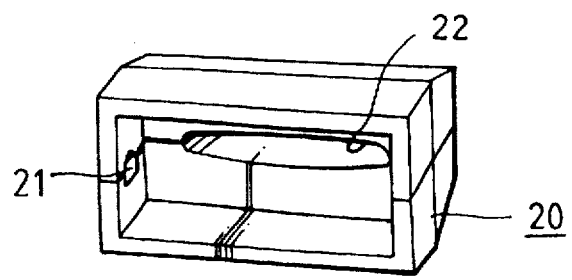
FIG. 5 is a perspective view of an optical cable protecting instrument which reinforces a weak part of the optic cable and protects the direct transmission of load.

FIG. 5 is a perspective view of the optical cable protecting instrument 20, in which in the inner wall thereof, a plug connecting lug 21 is formed so as to be fastened in a connecting groove 38 of the plug 30 and an attaching part 22 is formed on the inside so as not to act load upon the inner side by attaching the optical cable 50 introduced from the outside.

The function and effect of the present invention as above constituted will be described.

The optical ribbon cable 50 in both sides connected by the optical connector is supported by the optical cable protecting instrument 20, respectively and the optical path is maintained by connecting with each other in the section of ferrule 40 on the inside.

At the time of the connection, the plug projection 35 established on the cantilever 34 of the plug 30 is connected to the fastening groove 11 of the adaptor 10 so that it has a stability of connection.

The function of the said adaptor 10 is to arrange at the connection with the plug 30 including to arranging block 12, but also is to secure the stability on load from the outside after connecting with the plug 30.

The said arranging block 12 is devised to have a V-type shape having the lower part cut so as to be capable of arranging tightly in every direction simultaneously with a connection, and the groove 13 is formed therein so as to reduce a superprecision processing part. Also, it reduces difficulties of processing by using plane grinding.

The said arranging block 12 can use a variety of materials. In particular, by using the same material as that of the ferrule 40 can reduce an abrasion during the shaping or arranging process and improves commercial-viability in manufacturing.

The plug 30 fixes the ferrule 40 and forms the bonding strength between the ferrules 40 at the connection.

Also, it acts to connect with the adaptor 10 and the optical cable protecting instrument 20. Since the said plug 30 consists of two separate parts of the upper component 31 and the lower component 32, it has no difficulty at the assembly and also, the assembly becomes simple by connecting and fixing simply the projection 39 of the plug 30, without any fixing means.

The said ferrule 40 is fixed by a side lug 43 formed in the sides of the ferrule and a ferrule attaching part 33 of the plug 30 and, a gap is present in order to secure the operation in the direction of axis.

For reducing the load at the connection with the adaptor 10, the connecting part of the plug 30, uses the drooping phenomenon by the elasticity of the cantilever 34 and it fastens by locking of the fastening groove 11 of the adaptor 10 and the plug projection 35.

The plug 30 is connected by surrounding with the optical cable protecting instrument 20. In order to maintain the bonding strength which is the important function in the optical connector, after the leaf spring 37 having the elasticity is fixed in the spring inserting groove 36 of the plug 30, assembled and inserted, the bonding strength is maintained by applying the pressure to the back part of the ferrule 40 due to an elastic deformation.

The ferrule 40 effects the protecting function and the arranging function of the optical cable 50.

The reinforcing material-free optical cable 14 is inserted into the fine holes 42 of the precision shaped ferrule 40 and then, is fixed by an adhesive agent.

The side lug 43 formed in the side of the said ferrule 40 is connected with the ferrule attaching part 33 of the plug 30.

At the time of contact between the ferrule 40 in both sides for the connection of the optical connector, it is manually arranged by the insertion of the arranging block 12 into the dove of the tail groove 44 of the precision shaped ferrule 40.

In order to reduce the reflected loss at the time of contact between the said ferrules, it operates by a slope grinding, and in order to reduce a grinding time, the introduction part 41 at the end of the ferrule 40 has a shape to reduce an area.

The ferrule 40 is a grade of 20E-6 of which thermal expansion coefficient is reduced beyond than that of the common material by using a combination of epoxy resin and Carbon fiber. The ferrule is shaped by using a transfer shaping method, which preferably is a precision shaping method. And, the precision can be maintained by the precision of the mold, without post-processing.

The optical cable protecting instrument 20 is connected strongly with the plug 30 by the plug connecting lug 21 therein. Also, in order to improve the assembling property, it selects a hinged type of structure and it is connected with the optical cable 50 at the attaching part 22 in the inside of the optical cable protecting instrument 20 by an adhesive agent.

The optical cable 50, which is adhered to the attaching part 22 in the optical cable protecting instrument 20 by an adhesive agent, induces a slight bending to the optical cable in the space with the plug 30, while being connected with the plug 30. Thereby it prevents the ferrule connecting part from being directly affected by the load from the outside after the connection and thus, establishes the stability of the connection.

The present invention relates to provide a stable connecting circumstance by the structure and arranging instrument of the multifiber optical connector comprising a precision ferrule to produce by applying the shaping technique to a complex developed material to combine suitably epoxy resin and Carbon fiber in order to reduce the thermal expansion coefficient. The V-type shape of the arranging block is produced by a plane grinding technique which is devised in order to arrange the said ferrule and the plug, the adaptor and the optical cable protecting instrument etc. to support and connect the said arranging block.

As shown in the above, the present invention embodies the multifiber optical connector which expects to be used widely in the optical communication system and optical line by new arranging technique, structure and materials. In particular, since the development of the material having a low deformation can make a dependency on the superprecision shaping technique low, it can contribute to the stability of the production technique and is advantageous in view of stability against the load from outside and surrounding circumstance. Thus, it is a very useful technique.

While the foregoing disclose the preferred embodiment of the invention, it is to be understood that many changes in the detail may be made as a matter of engineering choices without departing from the spirit and scope of the invention as defined by the appended claims. Moreover, those skilled in the art may find that it is not necessary to adopt all of the various advantages and features of the present disclosure into other multifiber optical connectors in order to realize the individual advantages disclosed herein.

What is claimed is:

1. A multi fiber optical connector for connecting multifiber optical cables, said connector comprising:
   a plug which includes:
      a ferrule having an upper and a lower part and connected to the ends of the multifiber optical cable, said lower ferrule part having a lower side in which a dovetail groove is located, and having a front side which includes a guide means for guiding the ferrule in the assemblage of said connector,
      an upper member and a lower member for surrounding the upper and the lower parts of said ferrule, respectively, and
      an optical cable protecting member for enclosing at least part of the upper member and the lower member;
   an adaptor having opposing ends and an opening in each end into each of which a corresponding plug can be inserted and mounted so as to provide the interconnection of the optical cables, said adaptor opening being defined by an upper and a lower surface of said adaptor, and an aligning block mounted on said lower surface, and said aligning block having an upper part with an external configuration so as to mate with said dovetail groove of said ferrule so as to position the ferrule and align the optical cables connected to the respective ends of said ferrule with each other.

2. The connector as claimed in claim 1, wherein said ferrule is made of composite materials which are fabricated by mixing an epoxy resin with carbon fibers, said epoxy resin and carbon fibers being selected so as to reduce the coefficient of thermal expansion.

3. The connector as claimed in claim 1, wherein each of said plugs further comprises a leaf spring to maintain alignment between an assembly of said lower member and said upper member and said ferrule.

4. The connector as claimed in claim 3, wherein said upper member includes a cantilevered member and a first locking member associated with said cantilevered member, and
   wherein said adaptor further includes a second locking member associated with said upper surface thereof such that said first and second locking members can engage each other when said ferrule is inserted into said adaptor.

5. The connector as claimed in claim 1, wherein said upper member includes a cantilevered member and a first locking member associated with said cantilevered member; and
   wherein said adaptor further includes a second locking member associated with said upper surface thereof such that said first and second locking members can engage each other when said ferrule is inserted into said adaptor.

* * * * *